United States Patent Office 3,155,431
Patented Nov. 3, 1964

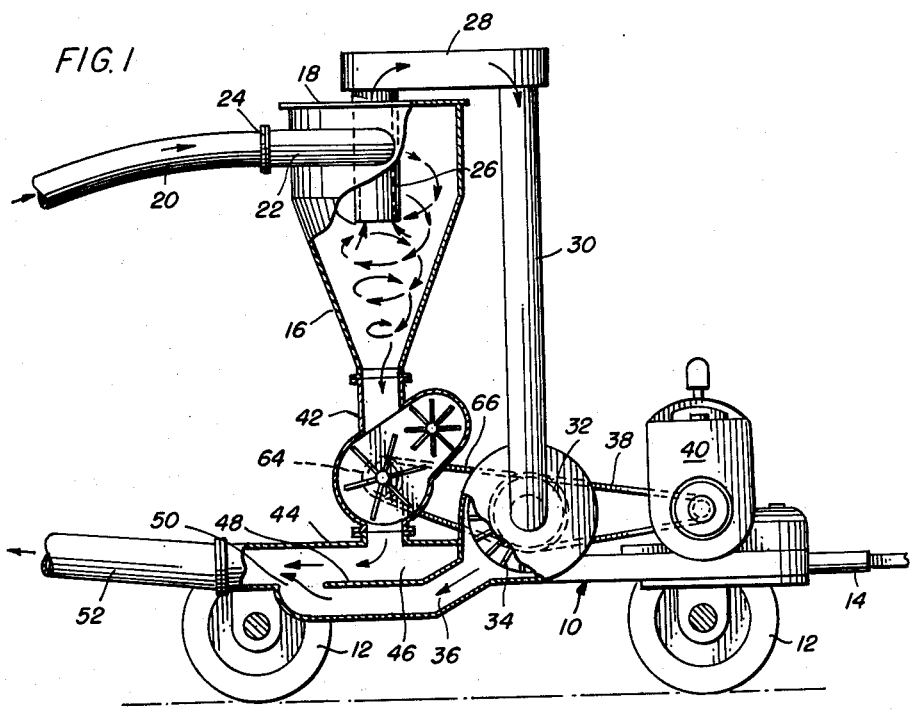

3,155,431
PORTABLE PNEUMATIC CONVEYOR
Charles A. Baldwin, 204 E. Kent St., Streator, Ill.
Filed Apr. 9, 1962, Ser. No. 185,945
6 Claims. (Cl. 302—23)

This invention relates in general to pneumatic material handling and more particularly to a portable pneumatic means for conveying different grains and other fluent material from one location to another without changing the character of the material.

Pneumatic conveyors of various kinds and types have heretofore been proposed, but in many of these the material to be conveyed either passes directly through the fan which creates the air blast, or passes through a valve disposed in the outlet of the hopper, and in either case, some foreign material or an enlarged piece such as a corn cob may engage in the valve causing damage and stopping the machine or frequently clogging and requiring repair of the apparatus.

A principal object of the invention is to provide a portable pneumatic conveyor in which granular and fluent material may be conveyed from one point to another, and preventing contact with any moving parts, preserving the original condition of the material and allowing foreign objects to pass through the apparatus without damaging the machine.

A further object of the invention is to provide a portable self-contained pneumatic conveyor apparatus mounted on a wheeled trailer, adapted to be moved thereon and set up for operation in any desired location.

A still further object of the invention is to provide a pneumatic conveyor power means for producing an air blast and vacuum by which the vacuum moves material from a source to a hopper, and in which combined air blast vacuum results in discharging material from the outlet to the hopper and projecting it through a discharge outlet to a desired location.

A still further object of the invention is to provide a portable pneumatic conveyor in which vacuum is directly applied to move material from a source to a hopper, and in which an induced vacuum is applied to the outlet of the hopper to assure movement of the material therethrough.

A further object of the invention is to provide a construction in which foreign members which may be drawn into the apparatus may be passed through the engaging wheels without clogging and collecting at the bottom of the hopper without damage to the operating mechanism and without requiring a special rotary or other valve construction.

Other objects of the invention will appear in the specification and will be apparent from the accompanying drawings, in which FIG. 1 is a side elevation of a pneumatic conveying apparatus in accordance with this invention with parts broken away in vertical section for additional clearness.

FIG. 2 is a sectional view of a feeder in accordance with the invention as shown in FIG. 1; and FIG. 3 is a sectional view of a modified feeder which may be interposed in place of FIGS. 1 and 2.

The invention disclosed in this application comprises a fan driven by a small internal combustion engine which creates a partial vacuum in a hopper. At the upper portion of the hopper is a material inlet conduit and the material is drawn into the hopper and falls by gravity to the lower end thereof. A discharge adjacent the bottom of the hopper opens into a chamber having a partial vacuum induced by the passage of an air blast from the discharge of the fan, additionally drawing the material from the bottom of the chamber. Thus the material entering the top of the hopper passes downwardly therethrough, and an air blast from the fan projects material from the bottom of the chamber through a discharge conduit to any desired location.

This stoppage and clogging is also likely to damage the parts to such an extent that extensive repairs are necessary rendering the apparatus unusable for a considerable length of time.

Referring now more particularly to the drawings, a chassis or frame 10 has ground engaging wheels 12 mounted thereon and a drive bar 14 attached at one end of the frame for moving the conveyor to any desired location.

Near one end of the frame is a material receiving hopper 16, the top being closed and made substantially air tight by a lid 18. An inlet conduit 20 is attached to an inlet pipe 22 by a flange coupling 24 adjacent the top and the pipe extending through the side wall of the hopper.

Also attached to the hopper 16 and communicating with the interior thereof adjacent the top, is a vacuum pipe 26, the lower end of which is open and preferably extends below the inlet pipe 22 and the upper end of the pipe extends through the top of the hopper or through the lid 18 where it has a closed connection with a vacuum duct 28 connected at the top of a downwardly extending pipe 30.

This pipe 30 extends to the center or inlet of a vacuum-blower 32 having a fan 34 therein for exhausting the air therefrom through a duct 36 at the bottom of the chassis. This blower 32 is driven by a belt 38 from an internal combustion engine 40 which therefore draws in the air through the pipe 30 causing a partial vacuum in the hopper and forcing the air outwardly therefrom in the duct 36.

The material drawn by vacuum within the hopper through the inlet conduit 20 being heavier than the air, falls from the bottom of the hopper usually in a somewhat spiral path as shown in FIG. 1. At the bottom of the hopper is a connected housing 42 which extends into the top of a fitting 44 containing the duct 36 for communication with the blower and also with a duct 46 spaced from the blower duct 36 by a partition 48 but having a restricted opening 50 at a point spaced below the connection of the fitting 44 with the housing 42, forming in effect a venturi leading to a material discharge conduit 52. Thus the blower tends to inject air from the duct 36 into the conduit 38 and to draw air causing a partial vacuum in the duct 46 at the bottom of the housing 42, and causing a movement of the material which passes downwardly through the hopper 16 and the housing 42 into the duct 46 and outwardly through the discharge conduit 52.

In order to maintain a substantially air tight passage in the housing 42 the housing has walls 54 and 56 forming a substantially circular casing for containing a fan 58 having vanes 60 which engage the walls and make a substantially air-tight contact therewith when mounted and rotated upon a shaft 62, preferably extending transversely of the housing 42. This fan preferably has a pulley 64 which is engaged by a driving chain 66 operated separately or in conjunction with the blower 32 by means of the engine 40.

The shaft 62 is preferably located centrally of the main up and down portion of the housing 42 and extending therefrom at an upward angle of approximately 45° is a sealing extension 68 which may be somewhat smaller in diameter than the circular walls 54–56 and contains a sealing wheel 70 comprising vanes 72, the outer ends of which engage opposite sides of the sealing extension and having a central hub or shaft 74 to which they are secured. The shafts of the sealing fan 58 and the sealing wheel 70 are parallel and spaced apart less than their joint lengths so that the ends of the vanes will interengage. This will cause the ends of the vanes 60 to engage the ends of the vanes 72 to rotate the fan and wheel in their respective portions of the housing, allowing ordinary material to pass downwardly with and through the vanes 60 to the fitting 44 below and at the same time engaging the ends of the vanes 72 to rotate the wheel 70.

The contact of the vanes 60 with the other vanes will make a sliding engagement with the ends of the vanes 72 wiping any larger or foreign pieces from engagement with the ends of the vanes 60 and causing them to be discharged downwardly into the space between the ends of the next vanes 60 and to pass through the housing 42 into the fitting 44 without jambing or clogging the wheels or stopping the mechanism and thereby causing damage and delay in repair. By having the ends of the vanes of the fan 58 and the sealing wheel 70 substantially in engagement at all times with a diametrical portion in which they fit closely, a virtual vacuum seal will be maintained and also the ends may be spaced apart in driving intervals so that a foreign article larger than the regular material which is handled may be passed through the housing without stoppage or damage.

The shaft 62 may be moved laterally in the sealing extension 68 by mounting the ends in blocks 76 pressed normally to one end of a rectangular frame 78 with a bar 80 fixed to the block and slidable through one end of the frame and a spring 82 interposed on the bar between the block 76 and the inner end of the frame 78 through which the bar extends.

This spring mounting will permit a lateral movement of the wheel 70 if it is necessary to disengage and pass large or foreign objects from engagement with the fan 58 and the wheel 70.

The ends of the vanes 60 of the fan and of the vanes 72 of the wheel 70 are adapted to make a substantially airtight frictional engagement with a shell 84 preferably of sheet metal and a similar shell extending partially around the peripheries of each of these respective parts.

A modification of these vane structures is shown in FIG. 3 in which a wheel or fan 88 with vanes 90 is rotatable about one side of a housing 92 and the ends of the vanes engage a semi-circular sheet metal plate 94 to make a substantially fluid-tight connection therewith. A cooperative fan or wheel 96 has spaced vanes 98 to extend between and to engage the corresponding vanes 90 of the fan 86 and also the ends of these vanes 98 are adapted to make a substantially fluid-tight connection with a metal sheet 100, arranged at the opposite side of the housing 92 and rotated (as in the case of fan 58 so that the ends of the vanes are always in substantial engagement when in operation, thereby making a substantial air-tight connection between the inlet and outlet ends of the housing 92 and 42.

In the case of the construction of FIG. 3, the ends of the vanes may project between their rotating members to a slightly greater extent than in the construction shown in FIGS. 1 and 2 and the vanes 98 of the wheel 96 are provided on the engaged and driving side near the end with angular outward projections 102, so that the ends of the vanes do not interengage when they are driven, the ends of the vanes 98 of the inner wheel 96 making a similar engagement with a metal sheet 104 extending oppositely to the metal sheet 94.

The driving engagement of the fan 58, vanes 60 with the vanes 72 causes a continuous wiping contact therewith and since these rotating vanes make a substantial air-tight engagement with their sheet metal parts 84 and 86 respectively, they will close off the lower end of the housing, allowing suction in the vacuum pipe 26 to draw grain and other material through the suction conduit 22 which will drop by its own weight to the bottom of the hopper and thence will be passed through the fan 58 and its contact wheel 70 and at this point, the suction and the pressure in the duct 36 induced by the fan 34, will cause a movement of the air outwardly through the opening 50 inducing a partial vacuum in duct 46 at the bottom of the housing 42 below the fan 58 therein, which will cause a movement of the material outwardly in the duct 46 and into the discharge conduit 52.

In no case will any of the material pass through the blower or fan 34; there are no valves, dampers or other obstructions in the path of flow of such material through the hopper and housing to the point of discharge; means is provided for preventing a larger part from clogging or obstructing the movement of the fan, and if any foreign material tends to engage upon the ends of any of the vanes, it will be wiped clear therefrom and will be discharged between the vanes of the fan 58 into the fitting 54. All of the parts thus described may be made of relatively inexpensive materials fabricated with the motor, blowers and chassis parts, granular or other fluid material may be conveyed over relatively long distances even though foreign bodies are presented, but they will pass through the machine without clogging or damaging the parts or over any obstruction to the free path of the material.

Although a preferred embodiment and improvement thereon have been described in some detail, it should be regarded by way of illustration and example rather than as a restriction or limitation thereof, as many changes in the construction, combination and arrangement of the parts may be made without departing from the spirit and scope of the invention.

I claim:

1. A portable pneumatic conveyor for fluent material comprising a movable frame, a hopper closed at the top and mounted on the frame and having a material inlet adjacent the upper end thereof, a blower having a conduit connecting its inlet with the top of the hopper, power means mounted on the frame for driving the blower to provide a partial vacuum within the hopper whereby fluent material is drawn through the material inlet into the top of the tower and drops therein by gravity, material receiving means disposed below the hopper and communicating therewith, whereby material will flow by gravity from said hopper to said material receiving means, an outlet at the bottom of said material receiving means, the material receiving means having circular portions therein, a wheel centrally mounted in the said circular portions having vanes extending from the wheel to make a substantially air-tight connection with the said circular portions, a driving connection for the said wheel from the said power means, a vaned pocket feeder in a substantially air closed side extension of the said circular portions having vanes with tips to engage with the vane tips of the said wheel and rotated thereby to admit a larger piece of foreign material between them to pass the ends of the wheel vane and to be wiped therefrom to avoid clogging of the vanes of the wheel, a material discharge duct at the bottom of the material receiving means to receive fluent material passed through said means by the rotation of said wheel, another duct adjacent the first mentioned duct and connected to the outlet of the blower for causing a partial vacuum in the first duct, and having an opening at a point beyond the inlet opening of the first duct with the said means, a discharge conduit forming a connection with both of said ducts whereby the air flow from the blower will cause a partial vacuum to draw material from said means through the wheel into the first duct and both ducts will combine to propel material through the said discharge conduit.

2. A portable pneumatic conveyor having an inlet conduit, an outlet conduit, a hopper closed at its top connected to the inlet conveyor, a hollow housing connected to the bottom of the hopper and having a discharge duct at its bottom, a blower having an air inlet connection with the top of the hopper free from the fluent material, power means on the frame for driving the blower, means forming a duct connecting the blower with a second duct beyond its connection with the bottom of the housing forming a venturi for drawing material from the bottom of the conveyor and propelling it through the discharge conduit, means forming a chamber with circular parts in said housing, a wheel having vanes making a wiping contact and a substantial air-tight connection with the circular portions of the housing, means for driving the said wheel from the power means for the blower, and an additionally vaned wheel rotatable in a circular portion spaced from the first wheel and having vanes also making a substantially air-tight connection with its circular portion of the housing, the extremities of the vanes of the first wheel engaging the extremities of the vanes of the second wheel in passing fluent material through said housing, the extremities having a wiping effect upon the ends of the blades and clearing them from engagement with large pieces of fluent material and foreign material which may be contained therein so that it will pass through the wheels of said housing without clogging or stoppage of the said driving connection.

3. A pneumatic conveyor system for fluent material in accordance with claim 2, in which the second said wheel is mounted on a spring pressed shaft in its portion of the housing, the housing having a circular extension into which the wheel and shaft may move away from the first wheel and the ends of its vanes still maintaining a substantially fluid-tight connection with the housing to cause a relative movement between both of said vaned wheels for relieving their engagement and causing a wiping action as they come together and separate to free clogging material from the ends of the vanes of the first wheel and to pass it through said housing without clogging.

4. In a pneumatic conveyor system for fluent materials in accordance with claim 2, the closed hopper having an inlet conduit tangentially connected to the periphery thereof for causing a whirling movement of the inwardly drawn fluent material, the air inlet connection for the blower having a pipe extending downwardly through the top of the hopper to a point below the peripheral air inlet conduit so that the fluent material heavier than air will tend to fall to the bottom of the hopper, the air separating therefrom and passing into the said downwardly projecting pipe.

5. A pneumatic conveyor system for fluent material in accordance with claim 2, in which the second said wheel has vaned extremities and is rotatable in the circular housing by contact engagement with the ends of the vanes of the first wheel, the contact side of each vane of the second wheel being provided with a projection adjacent the end thereof, adapted to engage and make a wiping connection with the end of the vanes of the first wheel to prevent engagement, clogging and stoppage of the first wheel in passing the fluid material through the said housing and also wiping the vanes clear of the engagement of any foreign materials in the said fluent material.

6. In a pneumatic conveyor system for fluent material in accordance with claim 2, a pair of circular extensions projecting oppositely from each other in the housing, a first wheel mounted into one of the circular projections having vanes making substantially fluid-tight connection with the housing, and the other wheel rotatable upon an axis separated from that of the first wheel at a distance greater than the length of either vane, but shorter then the lengths of two vanes so that the vanes intersect in passing a fluent material therethrough between them in a substantially closed and air-tight chamber formed by the two housings, the second wheel having a projection on each vane on the side engaged by a vane of the first wheel to provide a sliding contact therewith which will continue the rotary movement of the two engaging wheels, at the same time wiping any foreign material from the vane of the first wheel and permitting and continuing the movement of fluent material through the housing without clogging either of the wheels with its circular housing and stopping the operation of the machine.

References Cited in the file of this patent

UNITED STATES PATENTS

| | | |
|---|---|---|
| 692,239 | Collins | Feb. 4, 1902 |
| 1,785,585 | Humberston | Dec. 16, 1930 |
| 2,326,005 | Bradley | Aug. 3, 1943 |
| 2,686,084 | Baldwin | Aug. 10, 1954 |